United States Patent [19]

Posselt

[11] 3,842,990
[45] Oct. 22, 1974

[54] SYSTEM FOR LOADING A STACK OF SHEETS INTO A PLATEN PRESS
[75] Inventor: Manfred Posselt, Viersen, Germany
[73] Assignee: G. Siempelkamp & Co., Krefeld, Germany
[22] Filed: Feb. 28, 1973
[21] Appl. No.: 336,716

[30] Foreign Application Priority Data
Mar. 1, 1972  Germany............................ 2209901

[52] U.S. Cl............ 214/1 BB, 214/8.5 SS, 294/81 R
[51] Int. Cl. ............................................. B66c 1/42
[58] Field of Search............ 214/1 BB, 8.5 D, 8.5 C, 214/8.5 SS, 1 S, 1.5; 294/81 R; 271/205

[56] References Cited
UNITED STATES PATENTS
3,556,315  1/1971  Berger .............................. 214/1 BB
3,630,391  12/1971  Wilson .............................. 214/1 BB
3,655,316  4/1972  Husges ........................ 214/1 BT X Primary Examiner—Robert J. Spar
Assistant Examiner—George F. Abraham
Attorney, Agent, or Firm—Karl F. Ross; Herbert Dubno

[57] ABSTRACT

A pair of veneers sandwiching a chipboard core between them are gripped at each of their longitudinal edges by a pair of elongated jaws and this stack is then bent into a downwardly concave shape (e.g. of inverted catenary section) and moved into the press. The jaws then pivot downwardly to bend the sandwich into an upwardly concave shape, depositing the sandwich on the lower press platen. Thereupon the jaws are opened and retracted transversely and the sandwich is hot pressed into a hard laminate board. The carriage carrying the jaws also is provided with a plurality of vacuum lifts which pick up and displace the finished laminate board out of the press.

5 Claims, 7 Drawing Figures

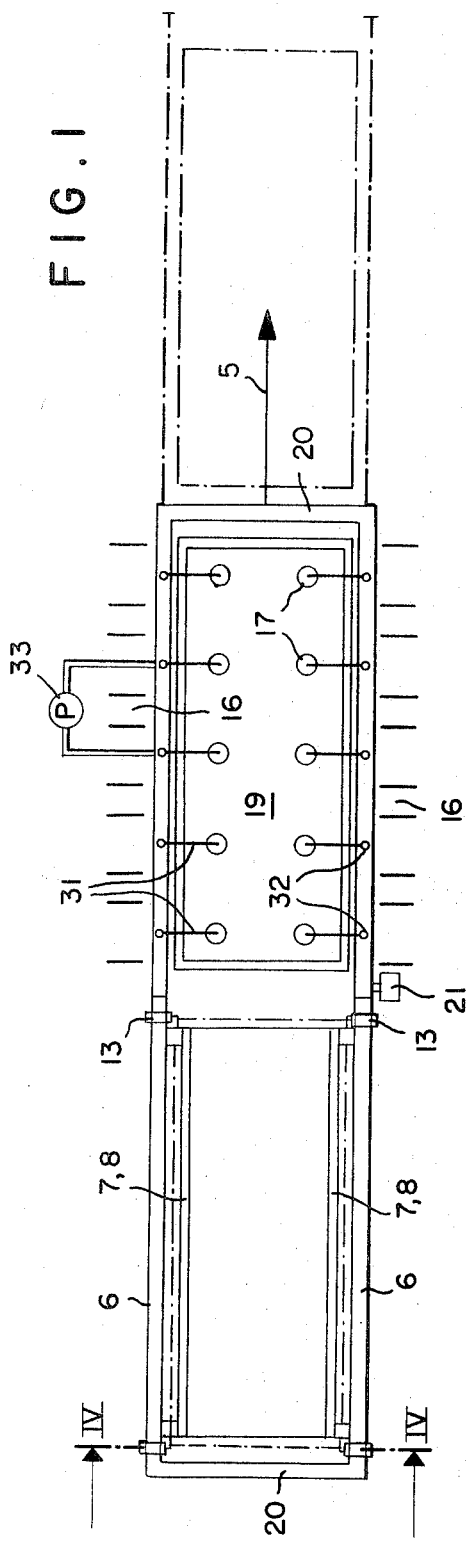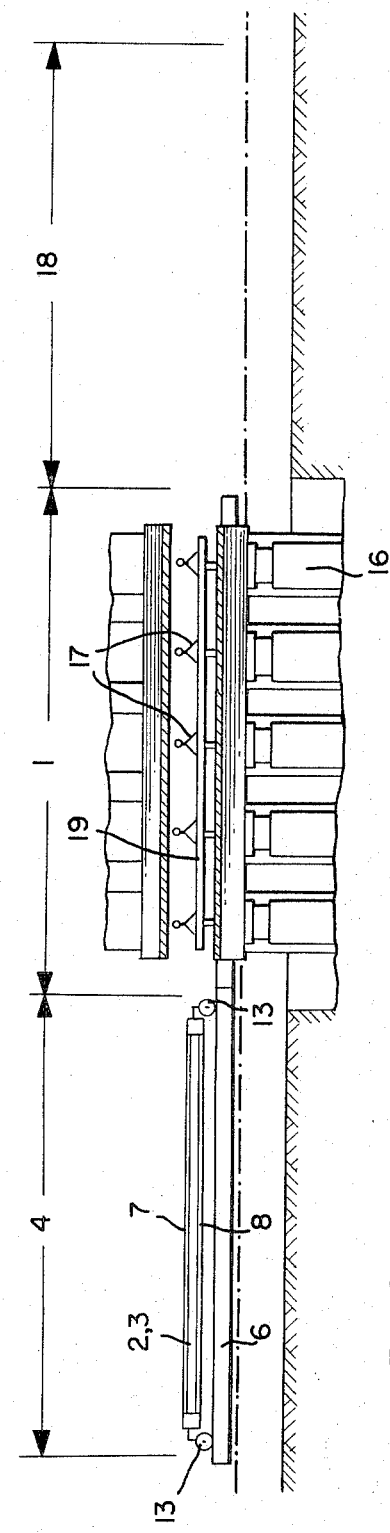

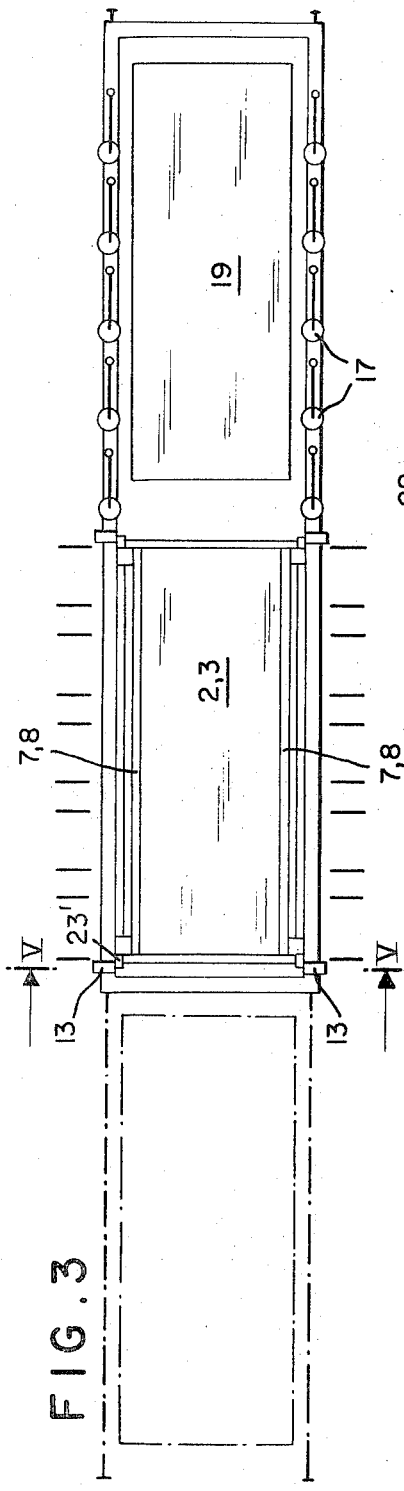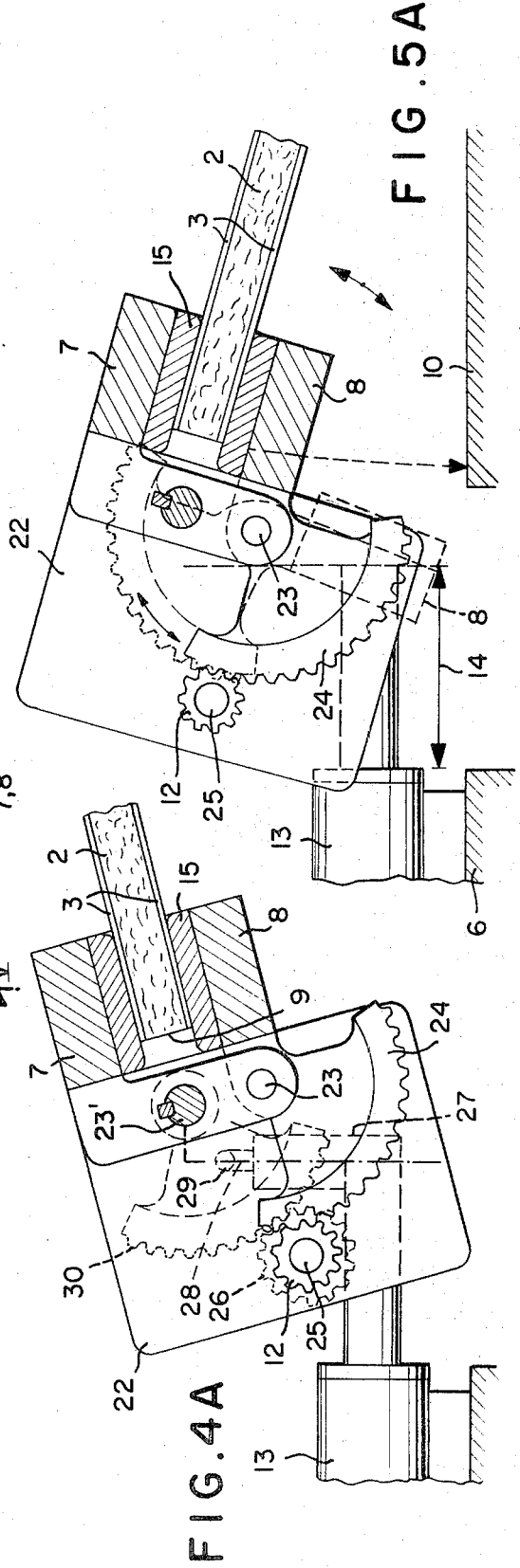

SYSTEM FOR LOADING A STACK OF SHEETS INTO A PLATEN PRESS

FIELD OF THE INVENTION

The present invention relates to a method of and an apparatus for loading a platen press or the like. More particularly, this invention relates to a system for transporting stacks of sheets, such as a fiberboard or clipboard core and veneer sheets, for producing laminated board or plywood.

BACKGROUND OF THE INVENTION

In the production of laminated board one or more veneers or surface-finishing layers are stacked with a clipboard, fiberboard or particle-board core, and the entire stack is transported into the platen press.

The most common expedient has been to form the stack on a so-called conveyor pallet which is an endless belt carried on a displaceable frame. This pallet is moved into the press and, as it is withdrawn at a predetermined rate, the conveyor is driven in the opposite direction at the same rate to deposit the stack in the press without relative movement of the stack and the receiving platen such systems are prone to breakdown, costly and complex, often in need of repairs.

OBJECTS OF THE INVENTION

It is therefore an object of the present invention to provide an improved system for displacing stacks of sheets, especilly in the handling of laminatable assemblies to be subjected to heat and/or pressure in a platen press.

Another object is to provide an improved method of and apparatus for loading a press for the production of laminated board.

SUMMARY OF THE INVENTION

These objects are attained according to the present invention in an installation wherein the stack of sheets is picked up by two pairs of jaws which grip its edges from top to bottom, then lift it and carry it horizontally into the press. The jaws then lower it onto the press platen and withdraw laterally, transverse to the direction of travel of the device.

In this manner the stack is maintained with the sheets all lying neatly one atop the other in the press without any chance of their being displaced relative to one another during deplacement or deposition in the press. The apparatus is basically very simple, and therefore highly unlikely to malfunction.

According to another feature of this invention the pairs of jaws are pivotal about respective horizontal axes and are first pivoted to be directed upwardly and therefore bend the stack so that it is downwardly cylindrically concave. It is transported in this position and the jaws are then rotated in the opposite direction so as to lay the centerline of the stack on the platen. Thereupon the jaws withdraw laterally, releasing the stack, to ease it onto the platen.

In accordance with another feature of the present invention the two pairs of jaws are mounted on a carriage which also carries suction pickups which serve to lift the pressed board and to remove it from the press. Once the stack is pressed, of course, it can be raised by such vacuum lifts with no difficulty.

It is important to the present invention that the pins grip the overhanging longitudinal edges of the rectangular stack lying upon the pick-up table to which the stack is transferred or upon which the stack is collected. The jaws which preferably extend the full length of the stack, should grip the latter with a minimum of compression and, to this end, the longitudinal edges of the stack are gripped between generally flat jaw faces which are parallel to one another in their maximum closed position and are preferably inclined upwardly and inwardly with respect to the stack during pickup. This minimizes the force which must be applied between the jaws. During deposition of the stacks the jaw faces may be turned into the downwardly and inwardly inclined positions.

DESCRIPTION OF THE DRAWING

The above and other objects, features, and advantages will become more readily apparent from the following description reference being made to the accompanying drawing in which:

FIG. 1 is a top sectional view of the apparatus according to the present invention;

FIG. 2 is a sectional view of the apparatus of FIG. 1;

FIG. 3 is a view similar to FIG. 1 showing the apparatus in a different position;

FIGS. 4 and 5 are end sectional views taken along lines IV—IV and V—V of FIGS. 1 and 3, respectively; and FIGS. 4A and 5A are large-scale detail views of FIGS. 4 and 5, respectively.

SPECIFIC DESCRIPTION

As shown in FIGS. 1–3 an apparatus for making a laminated board is subdivided into a central pressing station 1, a stacking station 4 upstream therefrom, and an unloading station or table 18 downstream therefrom, relative to a transport direction 5.

A pair of rails 6 parallel to each other and to the transport direction are displaceable in the transport direction to move a stack of sheets into the press 1 and then out of it after pressing. Crosspieces 20 at the downstream and upstream ends connect the rails 6 together, and a motor 21 serves to displace it back and forth.

At the upstream end the rails 6 carry to each side of the table 4 a pair of elongated jaws 7 and 8 each carrying a long elastomeric pad 15. Each upper jaw 7 is an elongated bar fixed on a pair of plates 22 (See FIGS. 4A and 5A) pivotal on a rod 23' extending parallel to direction 5 and displaceable back and forth transversely to the transport direction by hydraulic cylinders 13 as shown by arrow 14. The rods 23' are journaled in supports (not shown) carried by the cylinders 13.

The lower jaw is pivoted at 23 on the plate 22 at each end and is formed with a sector gear 24 meshing with a pinion 12 carried on a shaft 25 passing through the plate 22. Thus the lower jaw 8 can pivot about its axis 23. In addition a cylinder 27 is fixed on the end of the piston rod of cylinder 13 and has a piston rod 28 pivoted at 29 on a sector 30 pivoted on the respective rod 23' and meshing with a pinion 26 coaxial with and rotationally coupled to the pinion 12. In this manner expansion of the cylinder 27 can rotate the pinion 12 and tip the plate 22, the cylinder 27 first tipping the respective plate 22 to set the board 2, 3 down, and then opening the jaws to release it, and vice versa to pick the board 2, 3 up. Stops are provided to define end positions corresponding to the positions of FIGS. 4A and 5A. At the pickup table 4 the longitudinal edges overhang to allow gripping between the respective jaw pairs.

The pressing station 1 has a pair of press platens 10 and 11, both being vertically reciprocal into engagement with one another by means of cylinders 16, and both heatable to activate a binder in a central chipboard 2 so as to bond to it two veneers 3.

The rails 6 are provided at their downstream end with a plurality of arms 31 mounted on the end of vertical cylinders 32 and spring biased in all but the bottommost position of the cylinders such that they extend transverse to the transport direction, inwardly of the rails 6, in the down position they extend parallel to the rails 6. The free end of each arm 31 is provided with a respective suction lifter 17 connected through the arm 31 with a pump 33 which draws air in through these lifters 17.

The device operates as follows:

A stack is formed on the table 4 of two veneer sheets 3 sandwiching a chipboard 2. The rails 2 are upstream, in the FIG. 1 position, with the jaws 7 and 8 open and directed downwardly as shown in FIG. 5 in dot-dash lines, and with the cylinders 13 drawn fully back. The cylinders 13 and 27 are actuated simultaneously to move the clamping bars 7 and 8 in over the longitudinal edges 9 of the sandwich 2, 3, and to close the jaws 7 and 8 on this sandwich by pivoting of the lower jaw 8 around its axis 23. Once the lower jaw 8 firmly clamps the edge of sandwich 2, 3 against the upper jaw 7, continued displacement of the sector 30 serves to tip the plates 20 back into the position of FIG. 4A. This bends the sandwich into a downwardly concave shape as shown in FIG. 4.

The motor 21 is then actuated to displace the rails 6 downstream, to the right as seen in FIG. 1. Once the sandwich is between the platens 10 and 11 the sector 30 is displaced in the opposite direction to first bend the sandwich 2, 3 into an upwardly concave semicylindrical shape as shown in FIG. 5A so that its centerline comes to rest on the lower platen 10. Continued displacement of the sector 30 then pivots the lower jaw 8 clockwise, completely releasing the sandwich 2, 3 and easing it down on the lower platen. Cylinders 13 are then retracted to pull the clamping arrangements out of the press and the cylinders 16 are pressurized to hot press the sandwich into a laminate board 19. Since the sandwich 2, 3 is dropped onto the lower platen virtually all at once, it is heated all over to the same extent for an extremely uniform end product.

Simultaneously with the displacement of a sandwich 2, 3 into the press a previously formed laminate 19 is removed therefrom. This is effected by the lifters 17 which are dropped down onto the board 19, attaching to it like suction cups, and which are then raised to lift the board 19 clear of the lower platen. Displacement of the rails 6 to load a new sandwich 2, 3 into the pressing station 1 also displaces the lifters 17 to the right, thereby removing the previously formed laminate 19 from the press. This board is moved into the unloading station 18 where the pump 33 is stopped to drop the board 19 and the arms 31 are swung parallel to the rails 6 so that when the rails 6 are displaced back to pick up a new sandwich, while meanwhile the press is closed on the freshly deposited stack, the arms are free of the press. As soon as the press is opened these arms 31 are pivoted into the press and dropped as described above to pick up the freshly pressed laminate.

It should be understood that a plurality of installations as described above can be provided one above the other for charging a multiplaten press, or one such installation can be vertically displaceable to pick up a sandwich from one level and deposit it between any two platens of a multiplaten press. Furthermore the clamping arrangements can permit lateral sliding of the stack, and can imply be pulled away from the stack to drop it onto the press platen. The carriage formed by rails 6 and cross slices 20 can be divided into two pieces, one for the loading jaws, one for the section lifters. In addition, a lever or cam arrangement could be employed to effect the tipping and opening motions of the clamps.

I claim:

1. An apparatus for displacing a stack of at least two sheets from a pickup station in a heated-platen press, said apparatus comprising:

a carriage displaceable horizontally between said station and said press;

a pair of jaws on each side of said carriage, said jaws being elongated in the displacement direction of said carriage and dimensioned to extend over substantially the entire lengths of opposite edges of said stack;

means for closing said jaws on said opposite edges of said stack;

means for displacing said carriage from said station to said press with said jaws closed on said edges;

means for displacing said jaws transverse to said displacement direction;

a plurality of suction lifters spaced along opposite sides of said carriage downstream of said jaws; and means for swinging said suction lifters on said carriage, said suction lifters advancing said stack after consolidation of said press.

2. The apparatus defined in claim 1, further comprising means for pivoting each pair of jaws about a respective axis parallel to said direction from a first position directed generally downwardly prior to closing of said jaws on said edges to a second position directed generally upwardly after closing of said jaws on said edges.

3. The apparatus defined in claim 1, further comprising a body of elastomeric material on each of said jaws engageable with said stack.

4. The apparatus defined in claim 1, further comprising means for withdrawing air from each suction lifter.

5. The apparatus defined in claim 4 wherein each suction lifter further comprises an arm pivoted on said carriage and displaceable between a first position with said arm extending parallel to said direction to a second position with said arm extending transverse thereto.

* * * * *